(12) United States Patent
Vinci et al.

(10) Patent No.: US 7,913,546 B2
(45) Date of Patent: Mar. 29, 2011

(54) METHODS AND APPARATUS FOR ANALYZING INTERNAL COMBUSTION ENGINES

(75) Inventors: Peter Vinci, Mount Tremper, NY (US);
Brian E. Patterson, Kingston, NY (US);
Richard A. Frantz, Hatboro, PA (US);
Ian R. Vinci, Shandaken, NY (US)

(73) Assignee: Innovative Products of America, Inc., Mt. Tremper, NY (US)

( * ) Notice: Subject to any disclaimer, the term of this patent is extended or adjusted under 35 U.S.C. 154(b) by 192 days.

(21) Appl. No.: 12/277,507

(22) Filed: Nov. 25, 2008

(65) Prior Publication Data
US 2010/0126259 A1    May 27, 2010

(51) Int. Cl.
G01M 15/04    (2006.01)
(52) U.S. Cl. .................. 73/114.23; 73/114.77
(58) Field of Classification Search ............... 73/114.23, 73/114.77
See application file for complete search history.

(56) References Cited

U.S. PATENT DOCUMENTS

| | | | |
|---|---|---|---|
| 3,765,233 A | 10/1973 | Germann | |
| 3,839,906 A | 10/1974 | Hanson | |
| 3,938,378 A | 2/1976 | Fineman et al. | |
| 3,952,586 A | 4/1976 | Hanson et al. | |
| 3,964,301 A * | 6/1976 | Hanson et al. | 73/114.14 |
| 4,027,532 A | 6/1977 | Trussell et al. | |
| 4,050,296 A | 9/1977 | Benedict | |
| 4,050,297 A | 9/1977 | Pettingell et al. | |
| 4,062,232 A | 12/1977 | Sutphin et al. | |
| 4,126,037 A | 11/1978 | Hanson et al. | |
| 4,144,746 A | 3/1979 | Maringer et al. | |
| 4,309,900 A * | 1/1982 | Kreft et al. | 73/114.23 |
| 4,719,792 A | 1/1988 | Eriksson | |
| 4,809,540 A | 3/1989 | Lackner et al. | |
| 4,971,009 A * | 11/1990 | Washino et al. | 123/435 |
| 5,355,713 A * | 10/1994 | Scourtes et al. | 73/114.76 |
| 5,365,773 A | 11/1994 | Graze et al. | |
| 5,585,717 A | 12/1996 | Erikkson et al. | |
| 5,663,493 A | 9/1997 | Gerbert et al. | |
| 5,915,272 A * | 6/1999 | Foley et al. | 73/114.22 |
| 6,453,733 B1 | 9/2002 | Malaczynski et al. | |
| 6,463,795 B2 | 10/2002 | Kosmehl et al. | |
| 6,553,816 B1 * | 4/2003 | Palanisamy et al. | 73/114.59 |
| 7,690,338 B2 * | 4/2010 | Kawada | 123/90.15 |

* cited by examiner

*Primary Examiner* — Lisa M Caputo
*Assistant Examiner* — Freddie Kirkland, III
(74) *Attorney, Agent, or Firm* — Law Offices of Michael L. Wise, LLC

(57) ABSTRACT

An internal combustion engine is analyzed by an apparatus having a data processing capability. The engine has a plurality of cylinders and a battery operative to power a starter motor. The apparatus measures a time dependence of voltage level or current draw at the battery while the engine is being cranked by the starter motor. The apparatus also measures a respective time dependence of pressure at each of one or more locations in the engine. From the measured time dependence of voltage level or current draw, the apparatus determines a respective value indicative of a compression for each of the plurality of cylinders. Furthermore, the apparatus determines the presence or absence of one or more defects in the engine from the one or more measured time dependences of pressure.

19 Claims, 8 Drawing Sheets

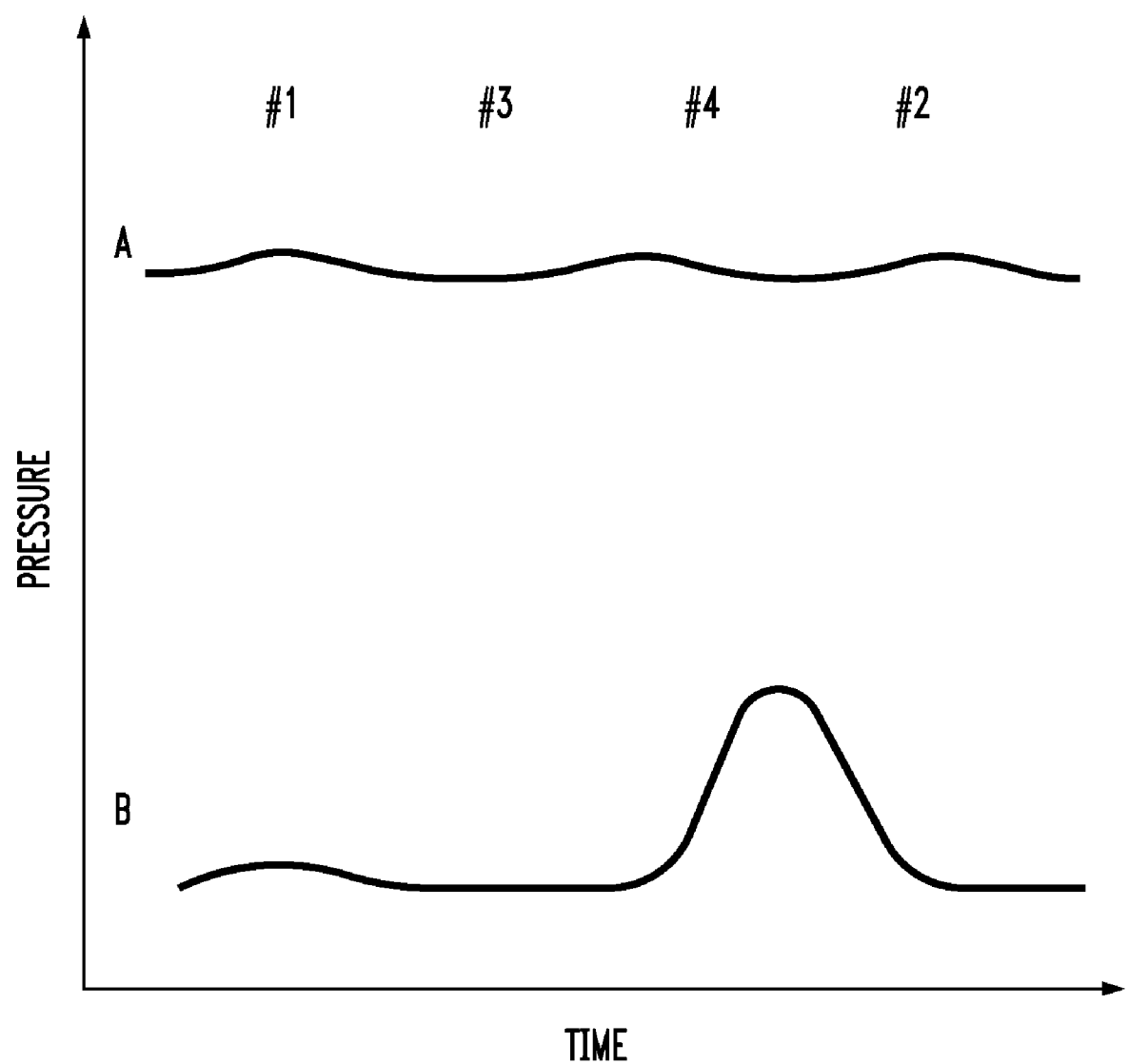

METHODS AND APPARATUS FOR ANALYZING INTERNAL COMBUSTION ENGINES

FIELD OF THE INVENTION

The present invention relates generally to analyzing internal combustion engines, and, more particularly, to methods and apparatus for determining relative cylinder compression and the presence of defects in internal combustion engines.

BACKGROUND OF THE INVENTION

Internal combustion engines are utilized extensively to power vehicles and equipment and, as a result, their composition and function will be familiar to one skilled in the art. A cylinder of a typical internal combustion engine undergoes four different sequential strokes during a single complete cycle of the engine: an intake stroke, a compression stroke, a combustion (or "power") stroke, and an exhaust stroke. FIG. 1 shows a sectional view of a cylinder 100 during its compression stroke. The cylinder can be broadly divided into a bottom end 105 and a top end 110, which are separated by a head gasket 115. The bottom end comprises a piston 120 which is connected to a crankshaft 125 by a connecting rod 130. The crankshaft sits in a crankcase 135. The piston includes piston rings 140 that act to seal the region above the piston from the crankcase below the piston. The top end, in turn, comprises a spark plug 145, an intake manifold 150, and an exhaust manifold 155. An intake valve 160 and an exhaust valve 165 are driven by camshafts 170. Both the bottom end and the top end of the cylinder are cooled by various liquid cooling ducts 175 that allow water to be circulated through the cylinder. Additional information on these elements and their function within an internal combustion engine may be found in, for example, R. Stone, "Introduction to Internal Combustion Engines," Third Edition, SAE International, November 1999, which is hereby incorporated by reference herein.

As indicated in FIG. 1, both the intake valve 160 and the exhaust valve 165 are closed when the cylinder 100 is in its compression stroke, allowing the combustible gases residing above the piston 120 to be compressed in preparation for ignition by the spark plug 145. In an internal combustion engine, the "compression" is the maximum pressure of the gases occupying the volume above the piston when the piston is in its compression stroke. Many gasoline automobile engines are specified by their manufacturers to have a compression of about 120-200 pounds per square inch (psi), although higher values are also sometimes utilized. A compression within the manufacturer's specification is desirable because it allows an internal combustion engine to efficiently extract mechanical energy from a given mass of air-fuel mixture. Unfortunately, several defects can occur in an internal combustion engine that can cause one or more of its cylinders to lose compression because of gas leakage from the volume above the piston. These defects include defects in the cylinder rings 140 that can cause excessive gas to leak into the crankcase 135 (i.e., excessive blow-by); defects in the intake valve and exhaust valve that can cause excessive gas to leak into the intake manifold 150 and the exhaust manifold 155, respectively; and defects in the head gasket 115 that can cause excessive gas to leak into the liquid cooling ducts 175, which are part of the engine's liquid cooling system.

The conventional manner of measuring compression involves removing a spark plug and using a pressure gauge to measure the pressure generated in a cylinder while the engine is being cranked by its starter motor. Unfortunately, such a methodology is work intensive and time consuming. As a result, other methods have been developed for measuring compression in internal combustion engines. Some alternative methods involve, for instance, measuring the voltage level or current draw on a battery as a function of time while that battery is powering a starter motor that is cranking the engine. Such methods are described in, for example, U.S. Pat. No. 5,585,717, entitled "Method for Measuring Starter Motor Current to Determine Engine Status," to Eriksson et al.; and U.S. Pat. No. 5,663,493, entitled "Apparatus and Method for Measuring Relative Compression," to Gerbert et al; which are not admitted as being prior art by their inclusion in this Background Section. These particular methodologies typically use peak heights in the voltage level or current draw waveform data to determine relative compression. Nevertheless, because the voltage level and current draw data gathered in this manner tend to include large fluctuations in baseline levels, these methods of analysis may be inaccurate and misleading. Moreover, while these techniques may, in some cases, be able to provide information about relative cylinder compression, they do not provide the user with any additional information about the root cause of any abnormal compression values.

For the foregoing reasons, there is a need for methods and apparatus that are operative to allow a user to conveniently and accurately determine the relative compression of each of the cylinders in an internal combustion engine, while, at the same time, also providing the user with useful additional information about the root cause of any abnormal compression values.

SUMMARY OF THE INVENTION

Embodiments of the present invention address the above-identified need by providing methods and apparatus that are operative to allow a user to conveniently and accurately determine the relative compression of each of the cylinders in an internal combustion engine, and to also provide the user with additional information about the root cause of any abnormal compression values.

In accordance with an aspect of the invention, an internal combustion engine is analyzed by an apparatus having a data processing capability. The engine has a plurality of cylinders and a battery operative to power a starter motor. The apparatus measures a time dependence of voltage level or current draw at the battery while the engine is being cranked by the starter motor. The apparatus also measures a respective time dependence of pressure at each of one or more locations in the engine. From the measured time dependence of voltage level or current draw, the apparatus determines a respective value indicative of a compression for each of the plurality of cylinders. Furthermore, the apparatus determines the presence or absence of one or more defects in the engine from the one or more measured time dependences of pressure.

In accordance with one of the above-identified embodiments of the invention, an engine analyzer comprises battery probe circuitry, a crankcase pressure sensor, an intake pressure sensor, and a cooling system pressure sensor. The battery probe circuitry is used to measure the time dependence of voltage level on the engine's battery while the battery causes a starter motor to crank the engine. Concurrently, the pressure sensors are utilized to measure the respective time dependence of pressure in each of the engine's crankcase, intake manifold, and liquid cooling system. The time dependence of the voltage level is described by a substantially sinusoidal waveform. The engine analyzer utilizes the periods within this waveform to determine a respective value indicative of compression for each of the engine's cylinders. Once these relative compression values are determined, the engine analyzer uses aspects of the pressure measurements at the various locations in the engine to arrive at a root cause for any abnormal compression values.

Advantageously, the above-identified embodiments of the invention provide the user with data that both describes the relative compression of the respective cylinders of an internal combustion engine and provides information about the presence of defects that are responsible for any abnormal compression values. In this manner, both the magnitude and cause of low compression in the internal combustion engine are determined.

These and other features and advantages of the present invention will become apparent from the following detailed description which is to be read in conjunction with the accompanying drawings.

BRIEF DESCRIPTION OF THE DRAWINGS

These and other features, aspects, and advantages of the present invention will become better understood with regard to the following description, appended claims, and accompanying drawings where:

FIG. 9 shows illustrative time dependences of liquid cooling system pressure.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 2:
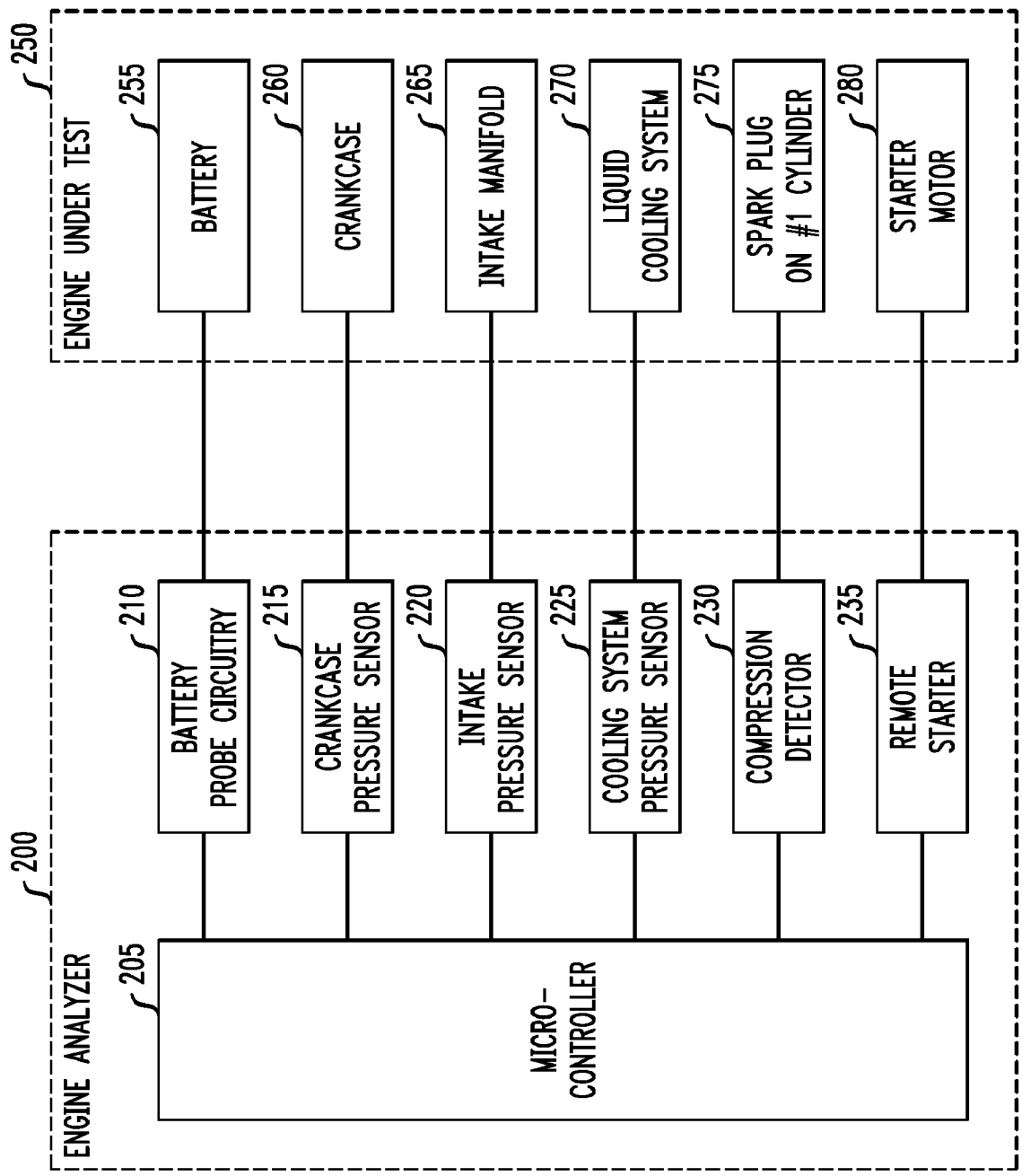
FIG. 2 shows a block diagram of an apparatus in accordance with an illustrative embodiment of the invention for analyzing an internal combustion engine.

FIG. 2 shows a block diagram of an apparatus 200 (hereinafter, the "engine analyzer") in accordance with an illustrative embodiment of the invention. The engine analyzer comprises a microcontroller 205 that is connected to battery probe circuitry 210, a crankcase pressure sensor 215, an intake pressure sensor 220, a cooling system pressure sensor 225, a compression detector 230, and a remote starter 235.

Figure 1:
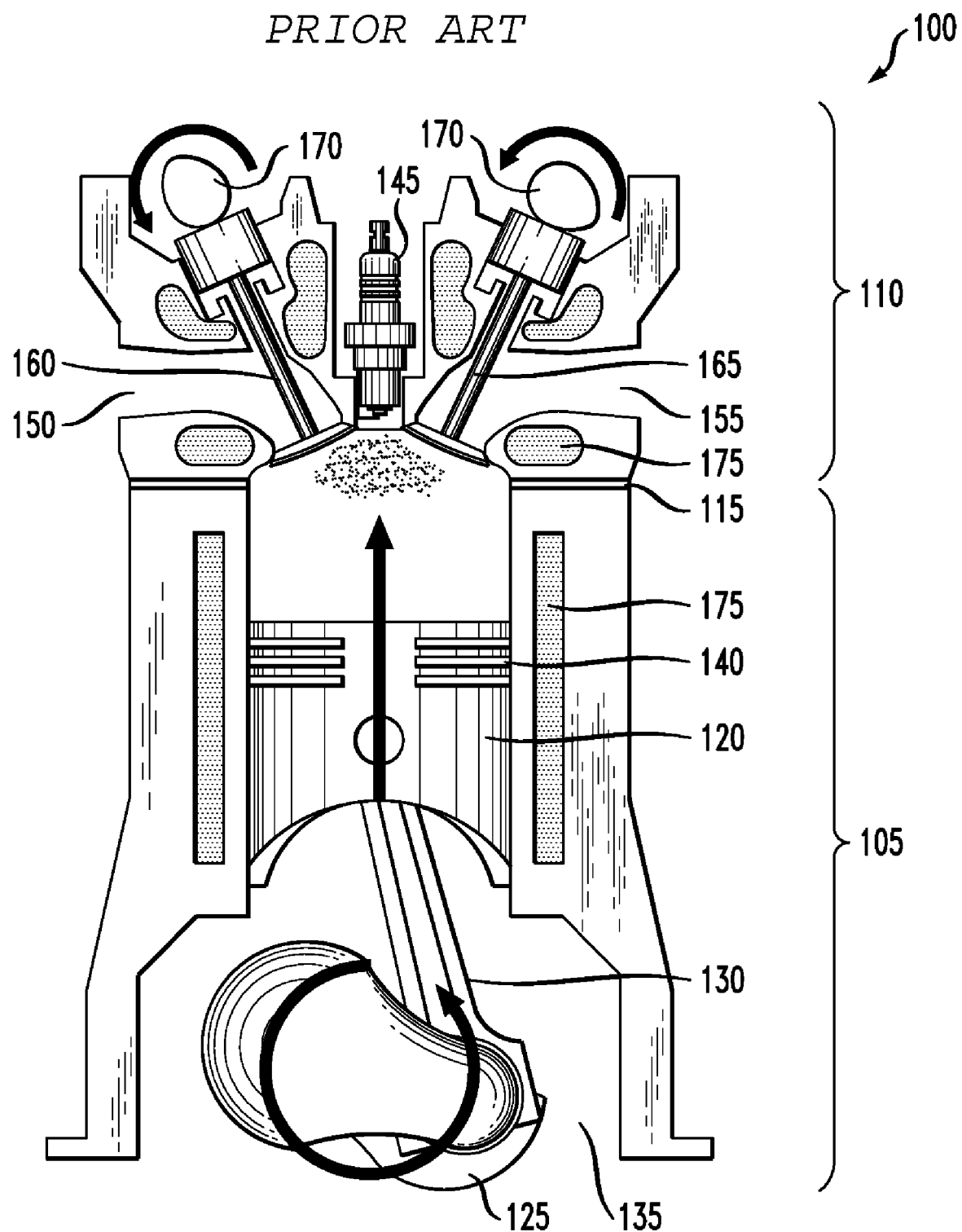
FIG. 1 shows a sectional view of a cylinder in an internal combustion engine.

The illustrative engine analyzer 200 is adapted for use with a conventional internal combustion engine 250 (hereinafter the "engine under test") having cylinders comprising those elements shown in FIG. 1. The engine under test comprises a battery 255, a crankcase 260, an intake manifold 265, a liquid cooling system 270, a spark plug 275 on the #1 cylinder, and a starter motor 280. The starter motor is operative to cause the engine to crank under power from the battery. For purposes of this invention, "cranking" means causing the engine to cycle without providing fuel or a spark to the cylinders.

Advantageously, the engine analyzer 200, once understood, may be implemented by one skilled in the art by combining conventional and commercially available electronic components. The microcontroller 205, for example, will preferably include a microprocessor, hardware timer, memories, input/output interfaces, and an analog-to-digital converter. It may be implemented using a conventional microcontroller such as, but not limited to, one from the MSP430 family of microcontrollers available from Texas Instruments® (Dallas, Tex., USA).

Figure 3:
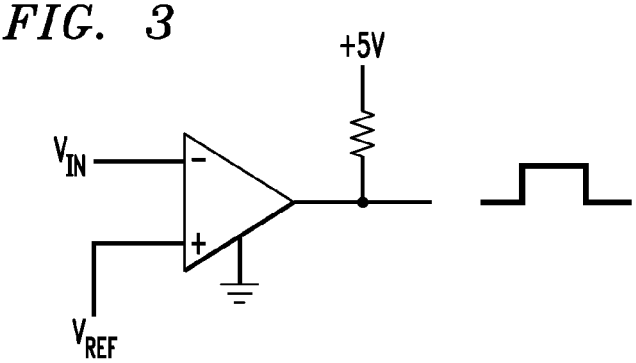
FIG. 3 shows a schematic of an illustrative battery probe circuit.

As will be described in greater detail below, the battery probe circuitry 210 is preferably connected to the positive and negative poles of the battery 255. It will be operative to produce a transistor-transistor logic (TTL) output square wave (e.g., 0 Volts (V) to 5V) that coincides with the voltage level at the battery transitioning upward and downward through a given reference voltage. The battery probe circuitry may, for example, be a form of zero crossing detector like, but not limited to, that shown in FIG. 3 (where $V_{IN}$ is the input voltage from the battery, and $V_{REF}$ is the reference voltage). Such comparator circuits will be known to one skilled in the art and are described in P. Horowitz et al., "The Art of Electronics," Second Edition, Cambridge University Press, 1989, which is hereby incorporated by reference herein.

The various pressure sensors 215, 220, 225, in turn, preferably comprise conventional pressure transducers that convert measured pressure into an electrical voltage. Such transducers are available from a number of sources, including Omega Engineering, Inc. (Stamford, Conn., USA). They are available in several pressure and voltage output ranges. As indicated in FIG. 2, the crankcase pressure sensor 215 is connected to the crankcase 260 of the engine under test 250. It may, for example, be placed in the port normally occupied by a positive crankcase ventilation (PCV) valve. The intake pressure sensor 220 is connected to the intake manifold 265 of the engine under test, where several ports are typically available for such access. Finally, the cooling system pressure sensor 225 is connected to the engine's liquid cooling system 270. The cooling system pressure sensor may, for example, be adapted to be placed on a radiator in the place normally occupied by a radiator cap.

The compression detector 230 is tasked with providing logical signals to the microcontroller 205 that indicate when a particular cylinder (in this case, cylinder #1) is in its compression stroke. In the present embodiment, the compression detector is preferably implemented in a manner similar to that described in U.S. Pat. No. 6,453,733, entitled "Method of Identifying Combustion Engine Firing Sequence Without Firing Spark Plugs or Combusting Fuel," to Malaczynski et al., which is hereby incorporated by reference herein. Briefly, the compression detector provides a high voltage signal to the spark plug 275 of cylinder #1 sufficient to cause the spark plug to repeatedly arc at high frequency when the spark plug is exposed to the lower pressure conditions realized when the cylinder is not in its compression stroke. The high voltage is, however, insufficient to cause the spark plug to arc when the spark plug is exposed the higher pressure conditions that are realized when the cylinder is in its compression stroke. The absence of high frequency arcing, thereby, becomes an indicator that cylinder #1 is in its compression stroke. This indicator is converted into a TTL logical output by a conventional logic detection circuit. Once the timing associated with the compression for one cylinder is determined in this manner, the timing of compression for the other cylinders can be easily acquired by simply applying the known firing order in the engine under test 250.

Finally, the remote starter 235 preferably comprises conventional circuitry that allows the engine analyzer 200 to control the on/off state of the starter motor 280. The remote starter may for example, interface directly with a relay that controls the starter motor or, alternatively, may interface to the starter motor itself.

Figure 4:
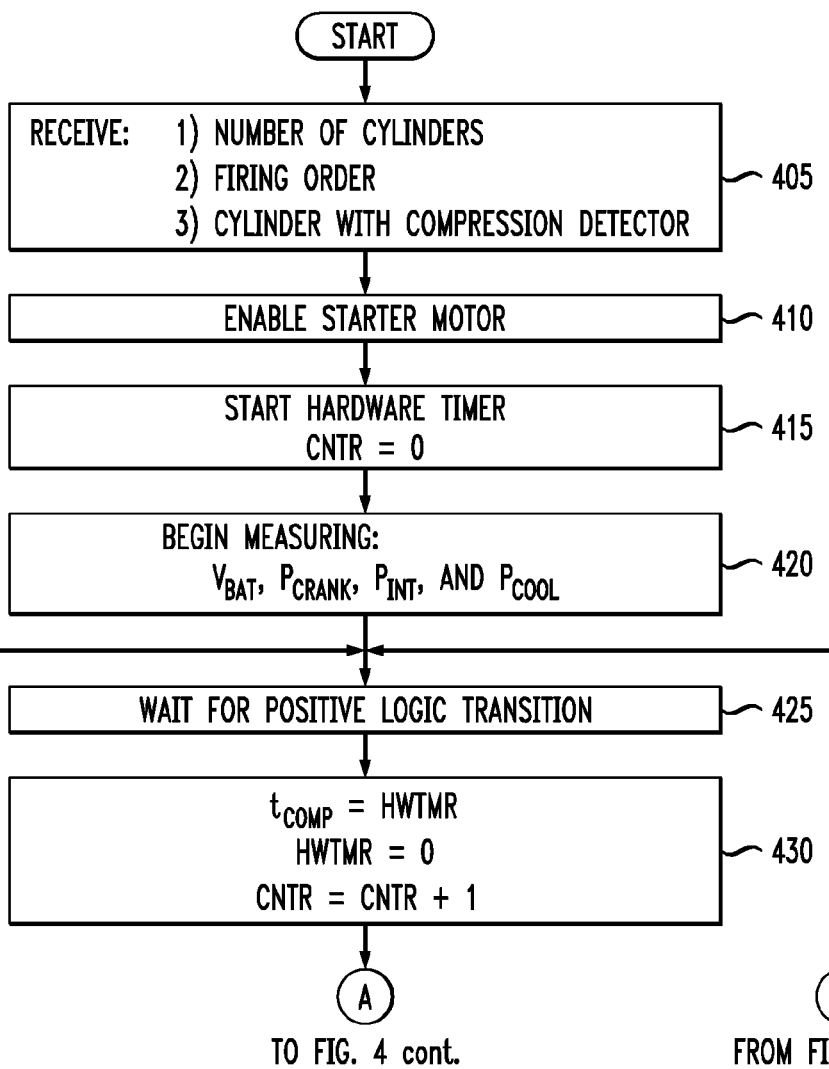
FIG. 4 shows a flowchart of an illustrative method of data acquisition in the FIG. 2 apparatus.
Figure 4:
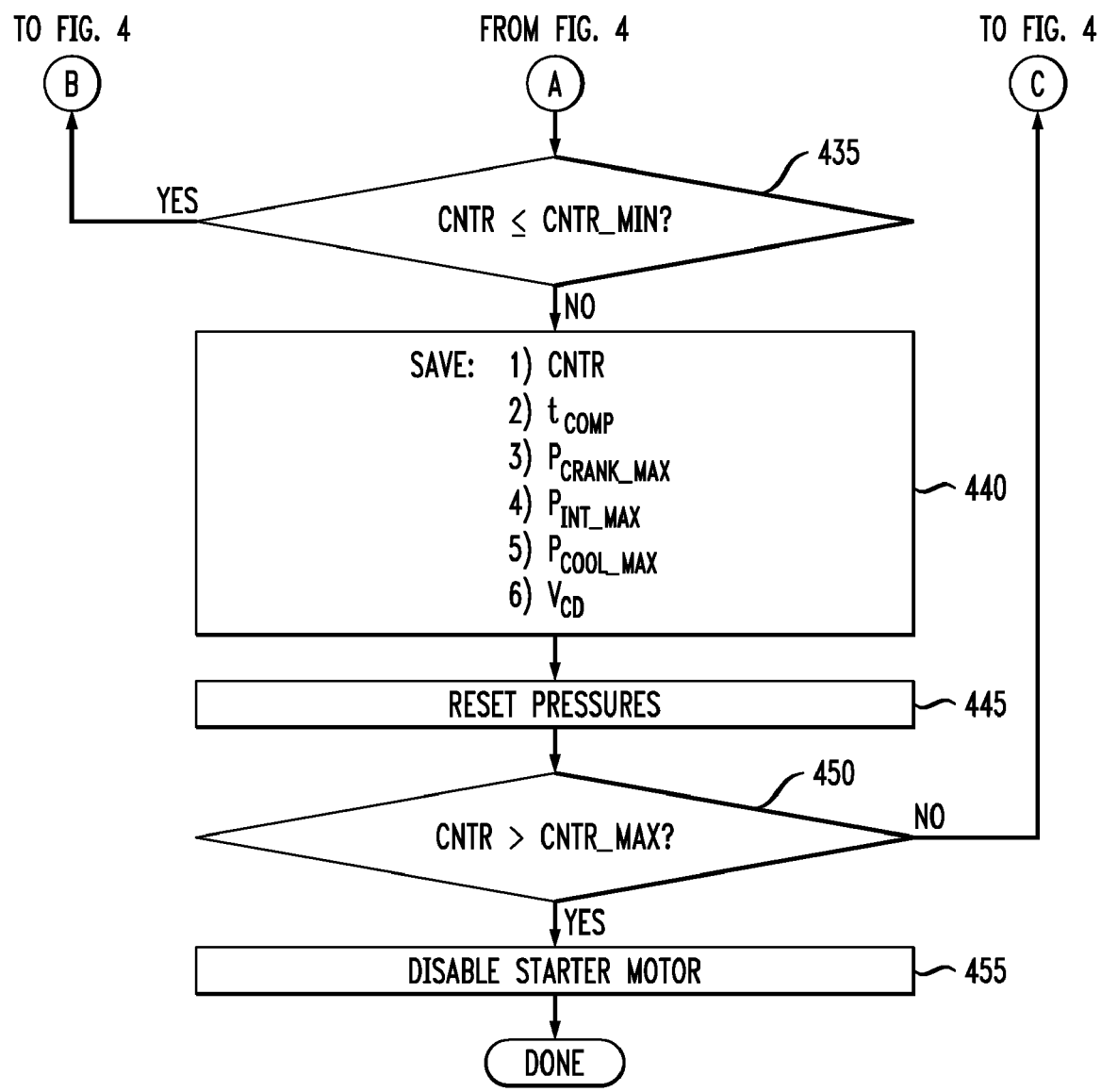
Figure 5:
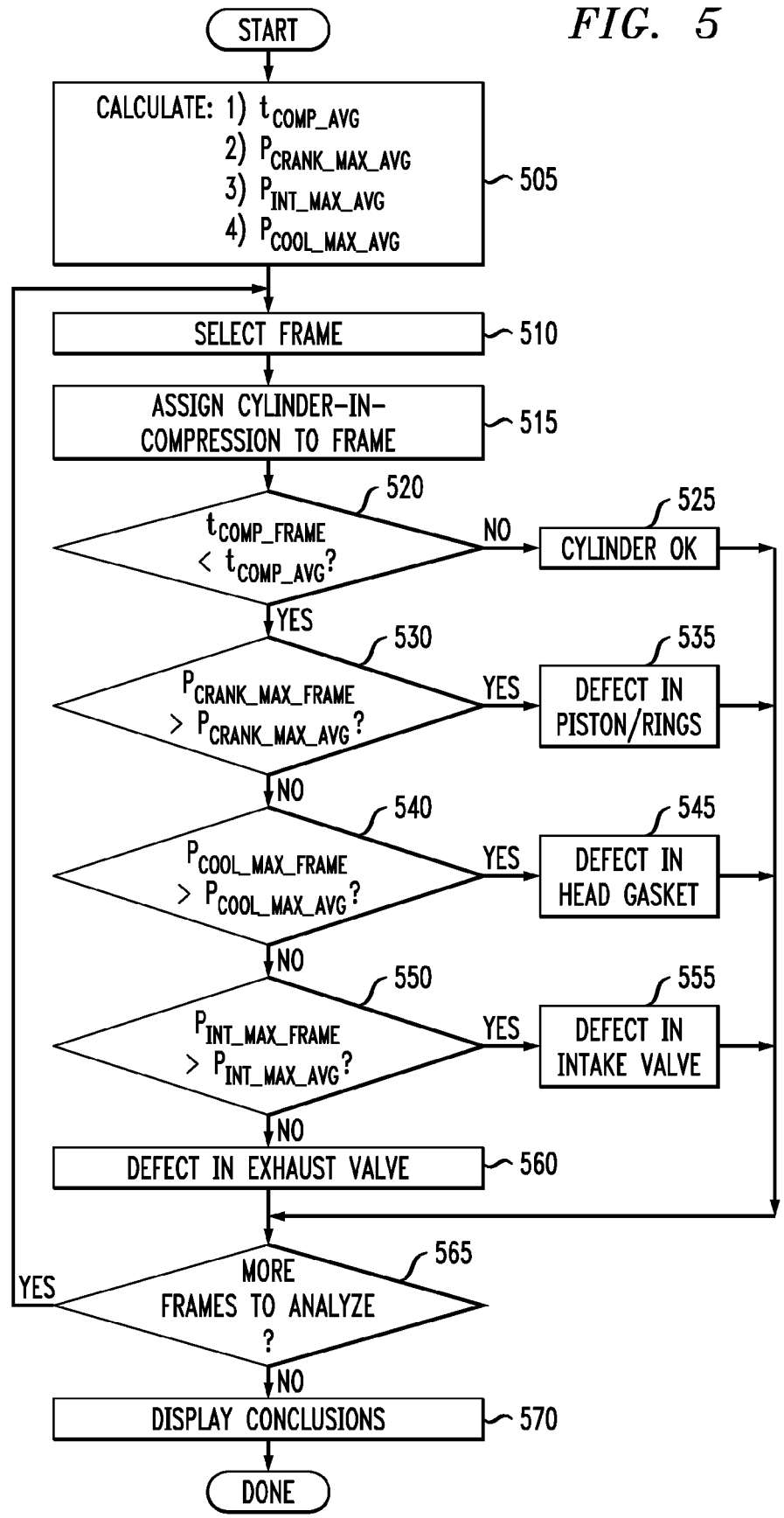
FIG. 5 shows a flowchart of an illustrative method of engine diagnosis in the FIG. 2 apparatus.

FIGS. 4 and 5 describe an illustrative method for analyzing the engine under test 250 using the FIG. 2 engine analyzer 200. The method can be broken into two portions: a data acquisition portion and an engine diagnosis portion. As will be described in greater detail below, in the data acquisition portion, the engine analyzer measures the time dependence of the voltage level at the battery 255 and the respective time dependence of pressure at each of the crankcase 260, intake manifold 265, and liquid cooling system 270 while the remote starter 235 causes the starter motor 280 to crank the engine. During the data acquisition portion, the compression detector 230 is also made to mark in time when cylinder #1 is in its compression stroke. Subsequently, in the engine diagnosis portion of the method, the data from the data acquisition portion is analyzed to determine a respective value indicative of the relative compression in each cylinder and to determine the presence or absence of various defects.

FIGS. 6-9 show representative examples of time dependences that might be collected by the engine analyzer 200 during the data acquisition portion of the method embodiment shown in FIG. 4. Waveform A in FIG. 6, for example, shows a representative time dependence for voltage level at the battery 255 as the starter motor 280 cranks the engine under test 250. The waveform has a characteristic substantially sinusoidal appearance. This characteristic appearance comes from the fact that the starter motor is acting in a periodic manner against the four cylinders in their respective compression strokes. Each time one of the cylinder enters its compression stroke, the starter motor must act against a larger mechanical resistance which, in turn, causes the starter motor to slow somewhat. Correspondingly, each time the starter motor slows it draws more electrical current from the battery. The periodic increase in electrical current corresponds with a periodic drop in voltage level across the internal resistance of the battery.

Figure 6:
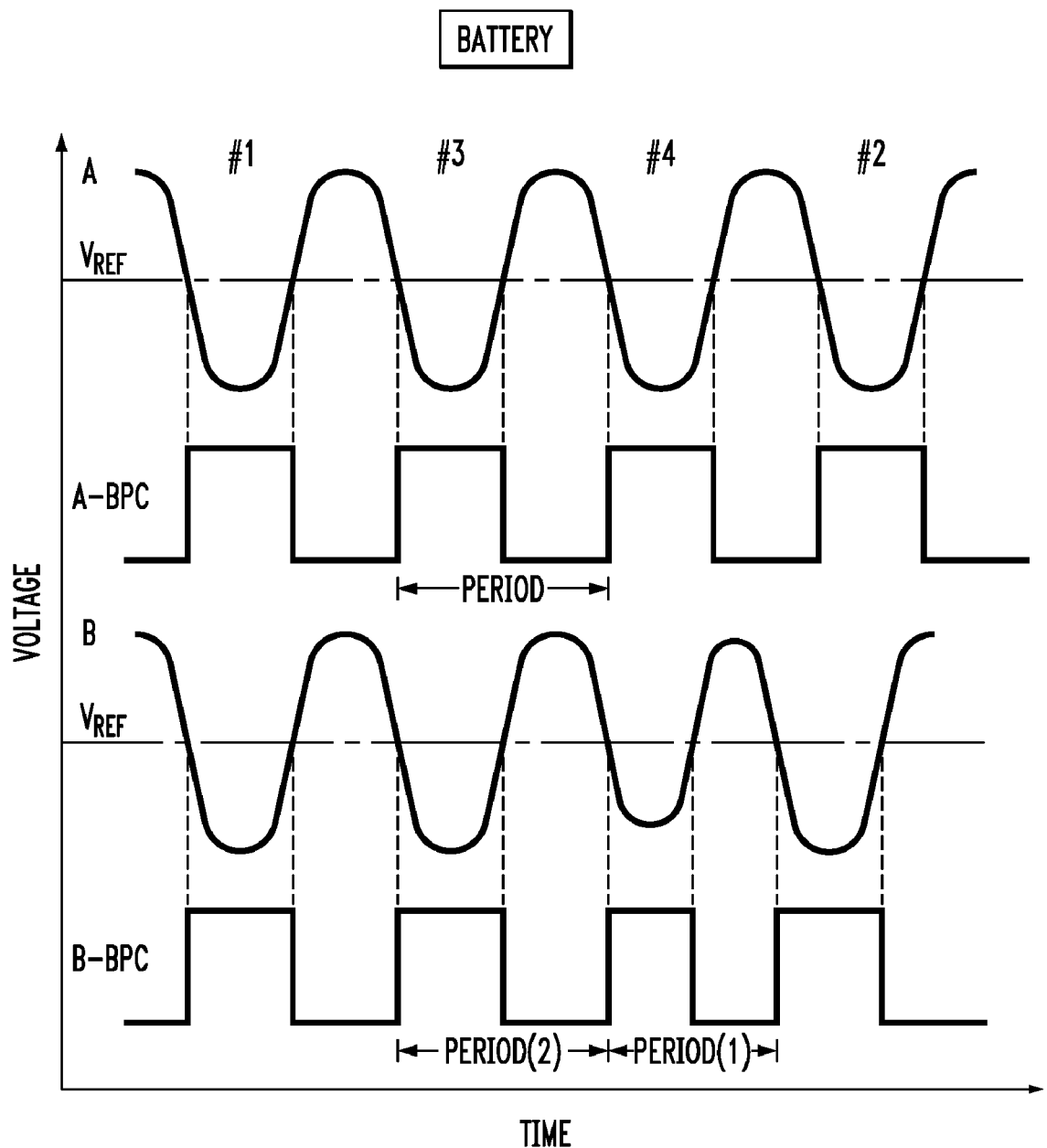
FIG. 6 shows illustrative time dependences of battery voltage level.

Waveform A in FIG. 6 corresponds to a healthy engine with relatively consistent compression across its four cylinders. Waveform B, in contrast, shows a time dependence that might be observed if one of the cylinders has a lower compression than the others (in this case, cylinder #4). Because cylinder #4 has a lower compression than the others, the starter motor 280 slows less when causing this particular cylinder to go through its compression stroke, which results in a smaller excursion in battery voltage level. Notably, the starter motor also passes through this phase of the engine cycle faster than it does when causing the other cylinders to go through their respective engine compression strokes. This results in the substantially sinusoidal voltage level waveform having a smaller period in the region where cylinder #4 is in its compression stroke than it does in the other regions where the other cylinders are undergoing their compression strokes. Correspondingly, changes in the periods of the voltage level time dependence become an easily measured and accurate means by which to determine the relative compressions of the cylinders. In this case, the period of the sinusoidal waveform in a respective portion of the voltage level time dependence becomes the indicator of the relative compression of a cylinder. Importantly, this approach to compression analysis differs substantially from others which typically use voltage level peak amplitudes instead of periods to determine relative compression. As mentioned earlier, this use of amplitudes tends to produce inaccurate and unrealistic results.

The battery probe circuitry 210 is a convenient mechanism by which to measure the change in the period of the substantially sinusoidal voltage level time dependence that characterizes an engine having cylinders of differing compressions. Waveforms A-BPC and B-BPC show the outputs of the battery probe circuitry with $V_{REF}$ set to the average voltage level acting on the battery during engine cranking (i.e., a voltage level approximately midway between the peaks and troughs of the voltage level waveforms). The battery probe circuitry produces a positive logic transition (i.e., a transition from 0V to 5V) when the voltage level drops below $V_{REF}$ and, correspondingly, produces a negative logic transition (i.e., a transition from 5V to 0V) when the voltage level increases above $V_{REF}$. Accordingly, the time between positive logic transitions is indicative of the period of the corresponding region of the voltage level time dependence waveform. Period (1) in Waveform B-BPC of FIG. 6 is, for example, substantially shorter than Period (2), indicating that cylinder #4 has a lower compression than cylinder #3 in this representative example.

Figure 7:
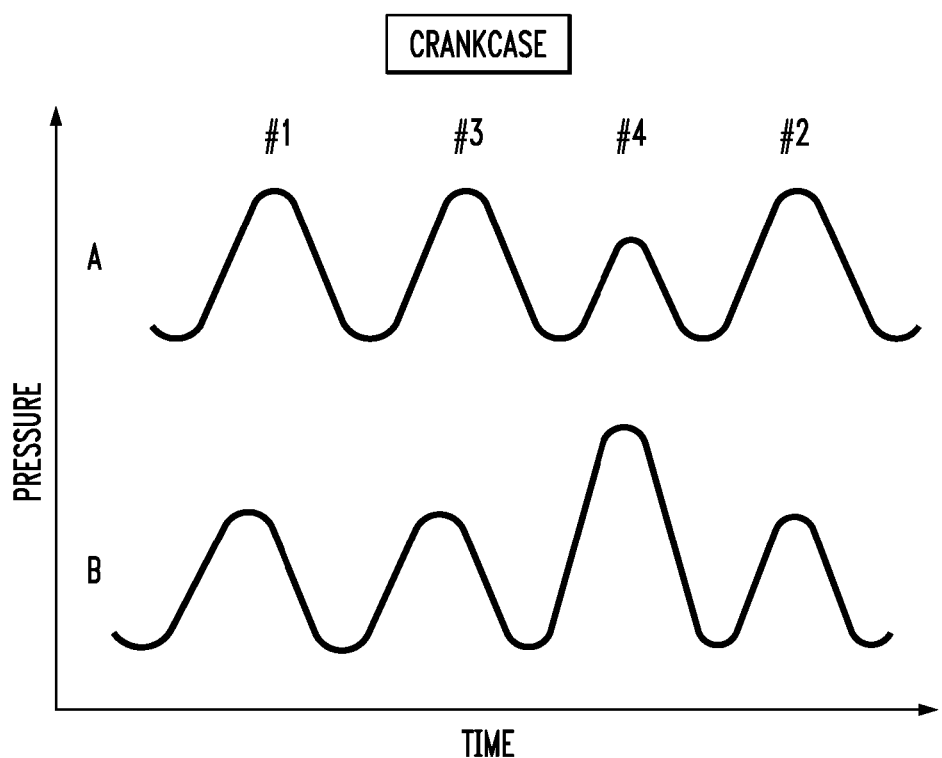
FIG. 7 shows illustrative time dependences of crankcase pressure.

FIG. 7 shows two representative time dependences of pressure in the crankcase 260 measured by the crankcase pressure sensor 215 during engine cranking. The crankcase pressure also has a substantially sinusoidal appearance in that it increases each time a cylinder is in its compression stroke. This periodic pressure increase is due to blow-by, the leakage of gas past the piston into the crankcase during compression. Waveform A provides an example where cylinder #4 shows a smaller pressure excursion in the crankcase than the other cylinders. Such a waveform signature, when combined with a lower compression measurement for cylinder #4, suggests that the lower compression in that cylinder is caused by a defect in the top end of the engine under test 250. Such a defect may comprise a defect in the intake or exhaust valves, or a defect in the head gasket. Waveform B, on the other hand, shows a larger pressure peak at cylinder #4 relative to the other cylinders. Such a signature is suggestive of excessive blow-by caused by, for example, a defect in the piston rings or the piston itself that allows excessive gas leakage past the piston into the crankcase during compression.

Figure 8:
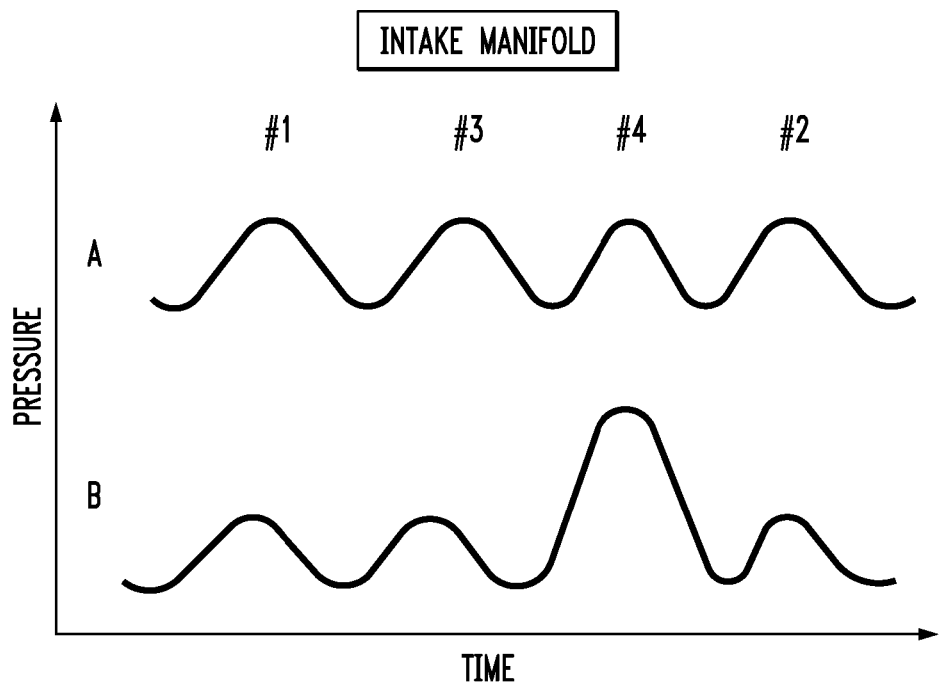
FIG. 8 shows illustrative time dependences of intake pressure.

FIG. 8, furthermore, shows two representative time dependences of pressure in the intake manifold 265 measured by the intake pressure sensor 220 during engine cranking. Here, waveform A provides an example where the intake pressure displays a consistent, substantially sinusoidal waveform with similar pressure maxima throughout. Such a waveform signature suggests that there is not an intake valve defect in any of the cylinders. Waveform B, on the other hand, shows a large pressure peak at cylinder #4 relative to the other cylinders. The large pressure excursion suggests a defect in the intake valve of cylinder #4 that allows excessive gas leakage past the intake valve into the intake manifold when cylinder #4 is in compression.

Finally, FIG. 9 shows two representative time dependences of pressure in the liquid cooling system 270 measured by the cooling system pressure sensor 225 during engine cranking. Waveform A shows an example where the cooling system pressure is largely flat. Such a waveform signature suggests that there are no defects in the head gasket. However, waveform B, on the other hand, shows a large pressure peak at cylinder #4 relative to the other cylinders. Such a signature, in combination with a lower compression measurement at cylinder #4, suggests that a defect in the head gasket is causing excessive gas leakage into the liquid cooling system when cylinder #4 is in compression.

FIG. 4 breaks down the data acquisition portion of the illustrative method embodiment into its primary steps. In step 405, the engine analyzer 200 asks the user to input engine parameters for the engine under test 250. These parameters may include, for example, the number of cylinders (e.g., four) and their firing order (e.g., 1-3-4-2). In addition, the engine analyzer asks the user to input the identity of cylinder that is connected to the compression detector (e.g., cylinder #1).

Subsequently, in step 410, the engine analyzer 200 enables the starter motor 280 using the remote starter 235. Then, in step 415, the engine analyzer starts the hardware timer within the microcontroller 205 and sets a counter parameter, CNTR, to zero. In step 420, the engine analyzer begins to measure the time dependences of the voltage level at the battery 255, $V_{BAT}$, as well as the pressure in the crankcase 260, $P_{CRANK}$; the pressure in the intake manifold 265, $P_{INT}$; and the pressure in the liquid cooling system 270, $P_{COOL}$. $V_{BAT}$ is, in turn, converted into TTL logic transitions by the battery probe circuitry 210, as discussed above.

In step 425, the engine analyzer 200 waits for a positive logic transition from the battery probe circuitry 210, corresponding to $V_{BAT}$ dropping below $V_{REF}$. In this manner, each positive logic transition from the battery probe circuitry acts as a trigger that initiates a frame in the data acquisition process. A "frame" as used in this context is meant to represent a single pass through steps 425-450. When the engine analyzer receives a positive logic transition from the battery probe circuitry, it moves to step 430. There, the parameter $t_{COMP}$ is set to the current time, HWTMR, indicated by the hardware timer. After performing this sub-step, HWTMR is reset to zero but the hardware timer is allowed to continue to run. In addition, CNTR is increased by one.

Next, in step, 435, the engine analyzer 200 determines whether CNTR is higher than some minimum, predetermined value, CNTR_MIN. It is been observed that, when beginning to crank an internal combustion engine, a starter motor may require a number of cycles before it comes up to full speed. Step 435 inhibits the engine analyzer from collecting data during this period of non-equilibrium. If CNTR≦CNTR_MIN, the method returns to step 425. If CNTR>CNTR_MIN, it is assumed that the starter motor 280 has come up to speed and the engine analyzer proceeds to step 440.

In step 440, the engine analyzer 200 saves several parameters into memory. Firstly, the engine analyzer saves the values of CNTR and $t_{COMP}$ that were set earlier in step 430. Next, the engine analyzer saves several values indicative of the various pressure measurements. More specifically, it saves the maximum value of $P_{CRANK}$, $P_{CRANK\_MAX}$; the maximum value of $P_{INT}$, $P_{INT\_MAX}$; and the maximum value of $P_{COOL}$, $P_{COOL\_MAX}$. These respective maximum values are readily determined by the microcontroller 205 in real time using a simple algorithm. Whenever a value of $P_{CRANK}$, for example, is received by the microcontroller, it is compared to the existing $P_{CRANK\_MAX}$. If the new $P_{CRANK}$ is higher than $P_{CRANK\_MAX}$, $P_{CRANK\_MAX}$ is changed to the higher value. If not, $P_{CRANK\_MAX}$ is left unchanged. The same running algorithm is applied to $P_{INTMAX}$ and $P_{COOL\_MAX}$. The engine analyzer also, in step 440, saves the logic state of the compression detector, $V_{CD}$.

Next, in step 445, the engine analyzer 200 resets $P_{CRANK\_MAX}$, $P_{INT\_MAX}$, and $P_{COOL\_MAX}$ to zero so that new maximum values may be determined in the next frame of the method.

Finally, in step 450, the engine analyzer 200 compares CNTR with a maximum, predetermined value, CNTR_MAX. This maximum counter value is used to determine when enough data has been collected and it is time to stop the data acquisition. It allows the user, if the user desires, to collect several frames for each cylinder's compression stroke. If CNTR≦CNTR_MAX, the engine analyzer returns to step 425 and starts a new frame. If CNTR>CNTR_MAX, the engine analyzer proceeds to step 455, wherein the starter motor 280 is disabled.

Because each frame of data acquisition in the above-described method embodiment is triggered by a positive logic transition at step 425, each frame corresponds to a period in the voltage level waveform measured at the battery 255. A period in the voltage level waveform, in turn, corresponds to a particular cylinder-in-compression (i.e., a particular cylinder going through its compression stroke). Therefore the method shown in FIG. 4 effectively causes the engine analyzer 200 to capture the set of parameters listed in step 440 for each cylinder-in-compression. The parameter $t_{COMP}$, for example, indicates the duration of the respective compression stroke for the associated cylinder-in-compression, while $P_{CRANK\_MAX}$, $P_{INT\_MAX}$, and $P_{COOL\_MAX}$ indicate the maximum pressure values achieved in crankcase 260, intake manifold, 265, and liquid cooling system 270, respectively, during that respective compression stroke.

FIG. 5 goes on to provide a flow chart for the engine diagnosis portion of the illustrative method embodiment. The flow is applied on a frame-by-frame basis, thereby allowing the presence or absence of one or more defects to be determined for each cylinder in the engine 250. In step 505, the average values of $t_{COMP}$, $P_{CRANK\_MAX}$, $P_{INT\_MAX}$, and $P_{COOL\_MAX}$ are computed from all the values saved in step 440 for all the saved frames. These values are saved as $t_{COMP\_AVG}$, $P_{CRANK\_MAX\_AVG}$, $P_{INT\_MAX\_AVG}$, and $P_{COOL\_MAX\_AVG}$, respectively.

Next, in step 510, the first saved frame is chosen for analysis, thereby becoming the "frame under analysis." The physical identity of the cylinder-in-compression for the frame under analysis is determined in step 515. This can be accomplished by the engine analyzer in straightforward manner using the data entered by the user in step 405 in combination with the data provided by the compression detector 230. For each frame, the state of $V_{CD}$ indicates whether or not the particular cylinder to which the compression detector (e.g., cylinder #1) was attached was in its compression stroke. For example, in a 4-cylinder engine with a firing order of 1-3-4-2, the compression detector would cause $V_{CD}$ to indicate compression every fourth frame (the "marked frames"). The engine analyzer would assign these marked frames to cylinder #1. The engine analyzer would then assign the frames immediately following the marked frames to the next cylinder in the firing order (e.g., cylinder #3), and so on.

Steps 520-560 of the engine diagnosis method shown in FIG. 5 attempt to replicate the defect detection analysis discussed above with respect to FIGS. 6-9. In step 520, the engine analyzer 200 compares $t_{COMP}$ of the frame under test, $t_{COMP\_FRAME}$, with $t_{COMP\_AVG}$. If $t_{COMP\_FRAME} < t_{COMP\_AVG}$, then the engine analyzer concludes that the cylinder-in-compression associated with the frame has a lower than average compression and may include a defect. Accordingly, the engine analyzer moves to step 530. Otherwise, the engine analyzer moves to step 525 and concludes that the cylinder is nominal (i.e., okay).

In step 530, the engine analyzer 200 compares $P_{CRANK\_MAX}$ for the frame under analysis, $P_{CRANK\_MAX\_FRAME}$, with $P_{CRANK\_MAX\_AVG}$. If $P_{CRANK\_MAX\_FRAME} > P_{CRANK\_MAX\_AVG}$, then the engine analyzer moves to step 535 and concludes that the cylinder-in-compression associated with the frame has a defect in its piston or piston rings that causes excessive gas to leakage into the crankcase. Otherwise, the engine analyzer moves to step 540.

In step 540, the engine analyzer 200 compares $P_{COOL\_MAX}$ for the frame under analysis, $P_{COOL\_MAX\_FRAME}$, with $P_{COOL\_MAX\_AVG}$. If $P_{COOL\_MAX\_FRAME} > P_{COOL\_MAX\_AVG}$, then the engine analyzer moves to step 545 and concludes that the cylinder-in-compression associated with the frame is affected by a defect in the head gasket that causes gas to leak into the liquid cooling system 270. Otherwise, the engine analyzer moves to step 550.

Finally, in step 550, the engine analyzer 200 compares $P_{INT\_MAX}$ for the frame under analysis, $P_{INT\_MAX\_FRAME}$, with $P_{INT\_MAX\_AVG}$. If $P_{INT\_MAX\_FRAME} > P_{INT\_MAX\_AVG}$, then the engine analyzer concludes that the cylinder-in-compression associated with the frame has a defect in its intake valve that causes excessive gas to leak into the intake manifold 265. Otherwise, the engine analyzer moves to step 560 and concludes that the cylinder-in-compression has a defect in its exhaust valve that causes excessive gas leakage into the exhaust manifold. This final conclusion is based entirely on a process of elimination.

After arriving at one of the conclusions 525, 535, 545, 555, 560 for the frame under test, the engine analyzer 200 is sent to step 565. In step 565, the engine analyzer determines if there are any additional frames to be analyzed. If yes, it moves back to step 510 and selects the next frame in the sequence of saved frames. This next frame becomes the frame under analysis. This cycle continues until all the saved frames are analyzed. At that point, the engine analyzer progresses to step 570, where it presents its various measurements and conclusions to the user. If, as is likely, the same cylinder is the cylinder-in-compression in a multitude of saved frames, then the engine analyzer preferably averages the measurements for each cylinder before presenting it to the user. In this manner, the user of the engine analyzer is provided with data that both describes the relative compression of each of the cylinders in the engine under test 250 and describes the root cause of any abnormal compression values.

It should again be emphasized that the above-described embodiments of the invention are intended to be illustrative only. Other embodiments can use different types and arrangements of elements or different methodologies for implementing the described functionality. The data acquisition method embodiment described in FIG. 4, for example, utilizes a trigger from the battery probe circuitry 210 to determine and store $t_{COMP}$, $P_{CRANK\_MAX}$, $P_{INT\_MAX}$, and $P_{COOL\_MAX}$ for each frame essentially in real time as the data is generated. This method has the advantage of requiring only modest memory resources in the microcontroller 205 because only a few parameters are saved in memory for each frame. However, in an alternative embodiment, the time dependences of the voltage level at the battery as well as the time dependences of the various pressures could be digitized and saved in memory in their entirety during data acquisition. Conventional data processing methods could then be used to revisit this digitized data at a later time to extract the necessary parameters for each frame. Such an alternative methodology would come within the scope of this invention.

In addition, although the engine analyzer 200 described above was equipped with three pressure sensors 215, 220, 225, alternative methods and apparatus falling within the scope of this invention may utilize an entirely different set of pressure sensors. An engine analyzer falling within the scope of the invention may, for example, utilize only one or two pressure sensors rather than using the three discussed above. Alternatively, an engine analyzer may utilize pressure sensors not explicitly described herein. A discrete exhaust pressure sensor in fluidic communication with the exhaust manifold of the engine, for example, would have the advantage of being able to detect defects in exhaust valves more directly than what is described above.

What is more, instead of measuring voltage level at the battery 255 while the starter motor 280 is cranking the engine 250, one could instead measure current flow. As one skilled in the art will recognize, voltage level and current flow are related by Ohm's Law and are, for the most part, easily interchanged.

Lastly, all the features disclosed herein may be replaced by alternative features serving the same, equivalent, or similar purpose, unless expressly stated otherwise. Thus, unless expressly stated otherwise, each features disclosed is one example only of a generic series of equivalent or similar features.

What is claimed is:

1. A method of analyzing an internal combustion engine having a plurality of cylinders and a battery operative to power a starter motor, the method to be performed by an apparatus having a data processing capability, and the method comprising the steps of:
   measuring a time dependence of voltage level or current draw at the battery while the starter motor is cranking the internal combustion engine;
   measuring a respective time dependence of pressure at one or more locations in the internal combustion engine while the starter motor is cranking the internal combustion engine;
   determining a respective value indicative of a compression for each of the plurality of cylinders from the measured time dependence of voltage level or current draw; and
   determining the presence or absence of one or more defects in the internal combustion engine from the one or more measured time dependences of pressure.

2. The method of claim 1, wherein the voltage or current measuring step is performed substantially concurrently with the pressure measuring step.

3. The method of claim 1, wherein each of the respective values indicative of compression consists of an amount of time.

4. The method of claim 1, wherein the time dependence of voltage level or current draw is described by a substantially sinusoidal waveform, and wherein each of the respective values indicative of compression is based on a period of a respective portion of the substantially sinusoidal waveform.

5. The method of claim 1, wherein the internal combustion engine further comprises a crankcase, and wherein the pressure measuring step comprises determining the time dependence of pressure in the crankcase.

6. The method of claim 1, wherein the internal combustion engine further comprises an intake manifold, and wherein the pressure measuring step comprises determining the time dependence of pressure in the intake manifold.

7. The method of claim 1, wherein the internal combustion engine further comprises a liquid cooling system, and wherein the pressure measuring step comprises determining the time dependence of pressure in the liquid cooling system.

8. The method of claim 1, wherein the compression determining step utilizes a zero crossing detector.

9. The method of claim 1, wherein the internal combustion engine comprises a crankcase and each of the plurality of cylinders comprises a respective piston, and wherein the defect determining step is operative to determine the respective presence or absence of a defect in each cylinder that causes gas leakage past the cylinder's piston into the crankcase when the cylinder is undergoing a compression stroke.

10. The method of claim 1, wherein the internal combustion engine comprises an intake manifold and each of the plurality of cylinders comprises a respective intake valve, and wherein the defect determining step is operative to determine the respective presence or absence of a defect in each cylinder that causes gas leakage past the cylinder's intake valve into the intake manifold when the cylinder is undergoing a compression stroke.

11. The method of claim 1, wherein the internal combustion engine comprises an exhaust manifold and each of the plurality of cylinders comprises a respective exhaust valve, and wherein the defect determining step is operative to determine the respective presence or absence of a defect in each cylinder that causes gas leakage past the cylinder's exhaust valve into the exhaust manifold when the cylinder is undergoing a compression stroke.

12. The method of claim 1, wherein the internal combustion engine further comprises a liquid cooling system and a head gasket, and wherein the defect determining step is operative to determine the presence or absence of a defect that causes gas leakage past the head gasket into the liquid cooling system when one or more of the plurality of cylinders is undergoing a compression stroke.

13. The method of claim 1, wherein the defect determining step is operative to determine the presence or absence of two or more defects in the internal combustion engine.

14. A method of analyzing an internal combustion engine having a plurality of cylinders, a crankcase, an intake manifold, an exhaust manifold, a liquid cooling system, and a battery operative to power a starter motor, the method to be performed by an apparatus having a data processing capability, and the method comprising the steps of:
measuring a time dependence of voltage level or current draw at the battery while the starter motor is cranking the internal combustion engine;
measuring a respective time dependence of pressure at at least one of the crankcase, the intake manifold, the exhaust manifold, and the liquid cooling system while the starter motor is cranking the internal combustion engine;
determining a respective value indicative of a compression for each of the plurality of cylinders from the measured time dependence of voltage level or current draw; and
determining the presence or absence of one or more defects in the internal combustion engine from the one or more measured time dependences of pressure.

15. The method of claim 14, wherein the pressure measuring step is performed substantially concurrently with the voltage or current measuring step.

16. An apparatus for analyzing an internal combustion engine having a plurality of cylinders and a battery operative to power a starter motor, the apparatus comprising:
battery probe circuitry operative to measure a time dependence of voltage level or current draw at the battery while the starter motor is cranking the internal combustion engine;
one or more pressure sensors operative to measure a respective time dependence of pressure at one or more locations in the internal combustion engine while the starter motor is cranking the internal combustion engine;
a data processor operative to determine a respective value indicative of a compression for each of the plurality of cylinders from the measured time dependence of voltage level or current draw, and to determine the presence or absence of one or more defects in the internal combustion engine from the one or more measured time dependences of pressure.

17. The method of claim 16, wherein the battery probe circuitry comprises a zero crossing detector.

18. The apparatus of claim 16, wherein the plurality of cylinders comprises a cylinder having a spark plug, and wherein the apparatus further comprises a compression detector operative to determine when the cylinder having the spark plug is in its compression stroke at least in part by placing a voltage across the spark plug and monitoring the spark plug while cranking the internal combustion engine to determine the presence or absence of electrical arcing across the spark plug.

19. The apparatus of claim 16, further comprising a remote starter operative to be electrically connected to the internal combustion engine and to cause the starter motor to crank the internal combustion engine.

* * * * *